Figure 1:
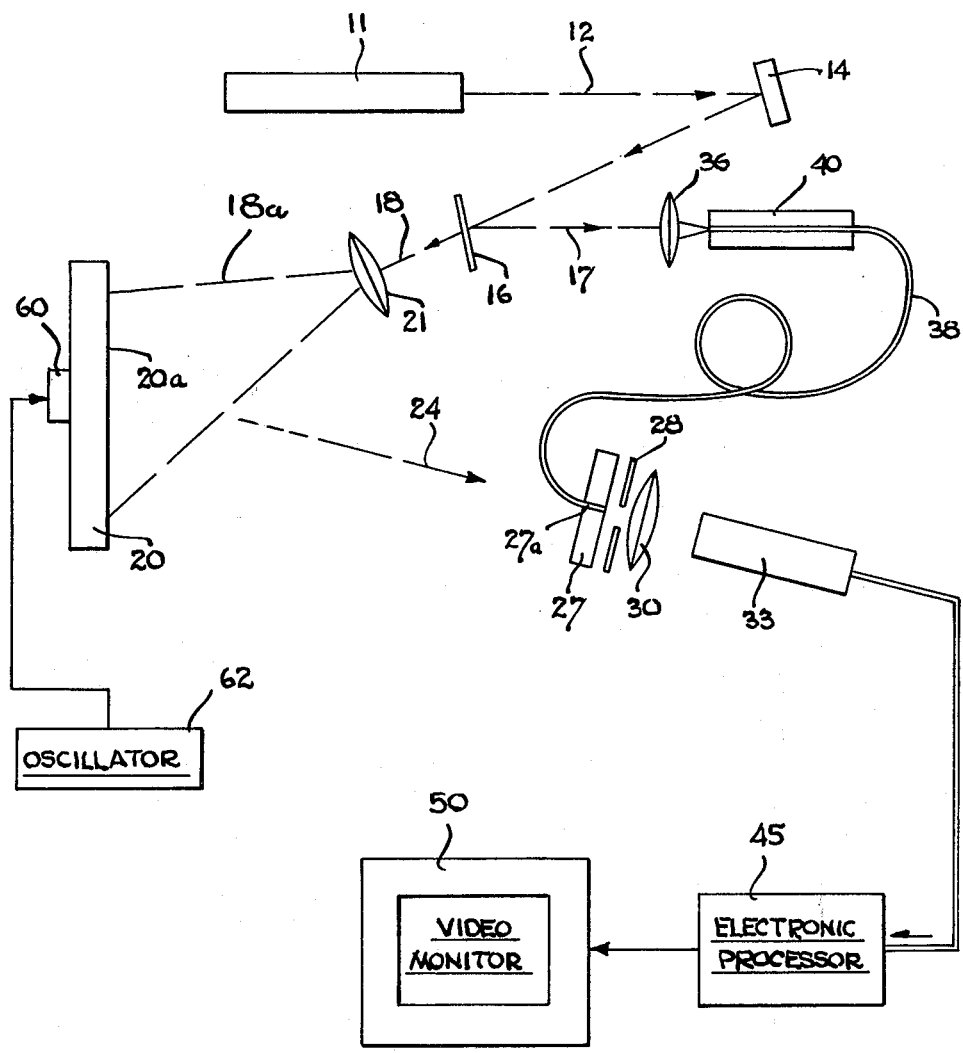

United States Patent [19]

Rowe et al.

[11] 4,352,565
[45] Oct. 5, 1982

[54] SPECKLE PATTERN INTERFEROMETER

[76] Inventors: James M. Rowe, 4705 Avenue C., Torrance, Calif. 90505; Rudolph W. Modster, 1916 Leighton Ave., Los Angeles, Calif. 90062

[21] Appl. No.: 224,184

[22] Filed: Jan. 12, 1981

[51] Int. Cl.³ .............................................. G01B 9/02
[52] U.S. Cl. ................................. 356/360; 350/96.15
[58] Field of Search ............... 356/347, 348, 359, 360; 350/96.15, 96.29, 96.33

[56] References Cited

U.S. PATENT DOCUMENTS 4,018,531  4/1977  Leendertz .......................... 356/360
4,191,476  3/1980  Pollard ............................ 356/360 X

OTHER PUBLICATIONS

Pedersen et al., "Holographic Vibration Measurement Using a TV Speckle Interferometer with Silicon Target Vidicon", *Optics Comm.*, vol. 12, No. 4, pp. 421–426, 12/74.
Glatzel et al., "Temperature Measurement Technique Using Fresnel Interference Technique", *IBM Tech. Disclo. Bull.*, vol. 20, No. 11A, pp. 4571–4572, 4/78.

*Primary Examiner*—John K. Corbin
*Assistant Examiner*—Matthew W. Koren

[57] ABSTRACT

A speckle pattern interferometer for use in the nondestructive testing of structures employs a laser beam which is split into reference and object beams having substantially the same optical path lengths to the screen of a sensor, such as a vidicon, where the two beams are combined. The object beam is reflected from the surface of an object under investigation, this object being vibrated periodically. The reference beam passes through an optical fiber cut to the proper length to equalize the length of the reference beam path with that of the object beam. The output of the vidicon is fed to an electronic processor where the signals are appropriately processed to provide a speckle pattern display on a monitor viewing screen.

5 Claims, 2 Drawing Figures

SPECKLE PATTERN INTERFEROMETER

This invention relates to a laser beam speckle pattern interferometer, and more particularly to such a device for use in the nondestructive testing of the structural characteristics of certain objects.

Speckle pattern interferometry is utilized in the prior art for the nondestructive testing of the structural characteristics of objects such as panels, turbine blades, bonding joints in panels, etc. A typical such prior art speckle pattern interferometer is described in U.S. Pat. No. 4,018,531, issued Apr. 19, 1977. In this type of device, a laser beam is employed, this beam being split by means of a beam splitter into reference and object beams. The object beam is directed against the surface of an object to be tested from where it is reflected through an appropriate optical system to a sensor surface of a suitable detector such as a vidicon. The reference beam is directed by optical means to this same sensing surface for combining with the object beam. The object and reference beams both come from the same direction and have the same path length so that when they are combined, an interference pattern is produced in accordance with any displacement from a given position that the surface of the object may undergo. In implementing such a device, the object is generally vibrated cyclically at a given frequency which may be in the low audio range, this resulting in an irregular displacement of any portions of the object surface having structural breaks or defects therein. The interfering signals received by the detector (vidicon) are fed to an appropriate electronic processor and from there to a display screen whereon a speckle pattern is produced in which any defects in the object are indicated.

In prior art interferometers of this type, the object and reference beams are generally recombined with each other, either by means of an optical wedge or an optical system employing a group of mirrors (as in the aforementioned Pat. No. 4,018,531). It has been found that both wedge and mirror techniques for recombining the beams present significant problems in maintaining alignment, particularly in field uses where the equipment may be subject to vibration, jarring, and other mechanical disturbances. Wedge type systems generally suffer from astigmatism which somewhat impairs the quality of the image produced on the display screen and generally requires the use of focusing lenses having relatively long focal lengths, due to the fact that the wedge must be placed between the lens and the detector.

The interferometer of the present invention overcomes the shortcomings of the prior art enumerated above by employing an optical fiber for conveying the reference beam to the detector, thus obviating the need for an optical wedge or a mirror system to combine the object and reference beams.

Briefly described, the interferometer of my invention is as follows: A laser beam is split into object and reference beams by a conventional beam splitter. The object beam is focused onto the surface of an object to be tested, this object being vibratorily driven. The reference beam is directed through a lens onto the end of an optical fiber which conducts this beam to a position directly opposite a detector surface which may be the screen of a vidicon. The object beam is reflected from the surface of the object being tested directly toward the surface of this same detector where it is combined with the reference beam. Undesired modes of light are stripped from the optical fiber by means of a "mode stripper" device which effectively dissipates such undesired optical modes which may be developed in the cladding of the optical fiber. The output of the vidicon detector is fed to an electronic processor where the signals are processed to generate a speckle pattern display on a video monitor screen.

It is therefore an object of this invention to minimize alignment problems in a speckle pattern interferometer.

It is a further object of this invention to provide means for simplifying the operation and adjustment of a speckle interferometer.

It is still another object of this invention to provide means for improving the quality of the display provided in a speckle interferometer.

Figure 2:
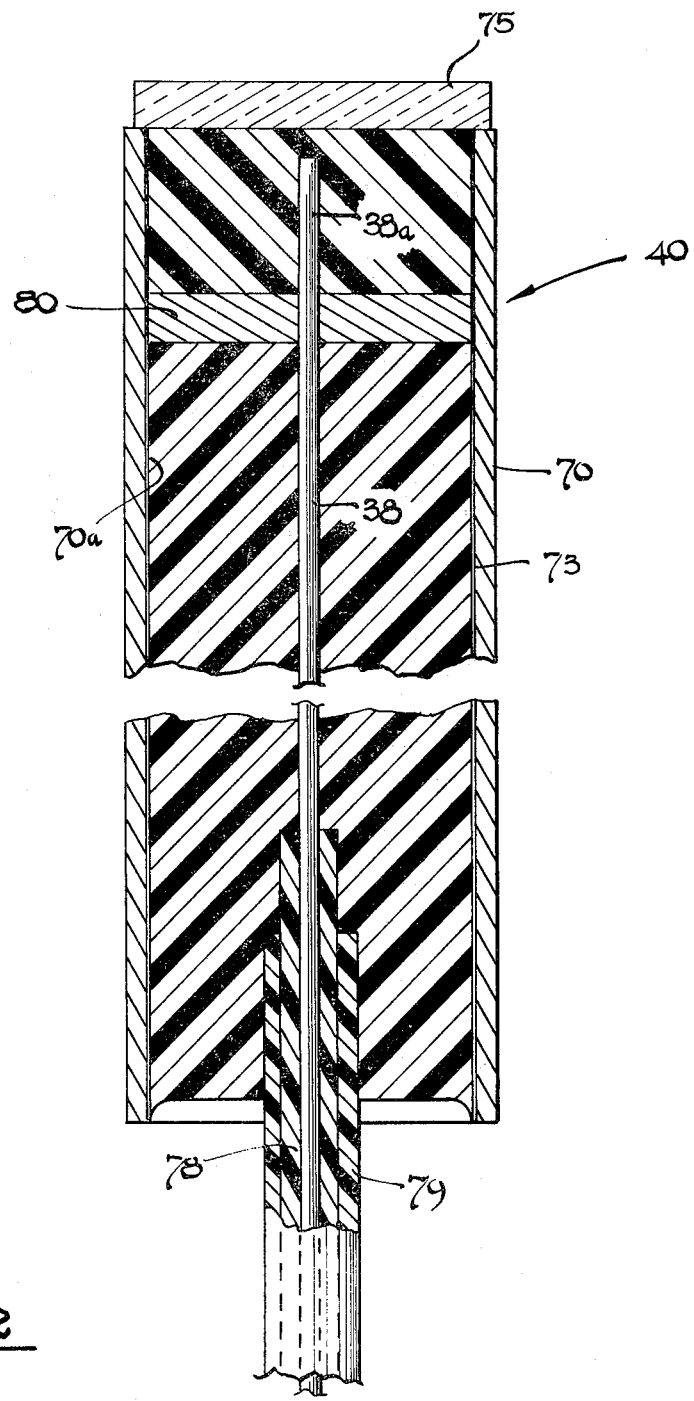

Other objects of this invention will become apparent as the description proceeds in connection with the accompanying drawings of which:

FIG. 1 is a schematic drawing illustrating a preferred embodiment of the invention; and FIG. 2 is an elevational drawing in cross section illustrating a mode stripper which may be employed in the system of the invention.

Referring now to FIG. 1, a preferred embodiment of the invention is illustrated. A coherent light beam 12 is generated by laser 11, this light beam being reflected from the surface of mirror 14 to the surface of beam splitter 16. Beam splitter 16 splits the beam into a reference beam 17 and an object beam 18. Object beam 18 is expanded and projected onto the surface 20a of an object 20 to be tested by means of lens 21.

The expanded object light beam 18a is reflected off the surface 20a along an optical axis indicated by arrow 24, this light beam passing through clear window 27 and iris 28 to lens 30 which focuses the beam onto the sensing surface of vidicon 33.

Reference beam 17 is focused by means of lens 36 onto the finished end of single mode optical fiber 38. The end portion (about 4 inches thereof in an operative embodiment) of fiber 38 is mounted in a mode stripper device 40 which effectively removes or "strips" undesired optical modes which might otherwise be generated due to light refraction in the cladding of the optical fiber. A preferred embodiment of the mode stripper is illustrated in FIG. 2 and will be described in connection with that figure further on in the specification. The opposite end of single mode optical fiber 38 is cemented to the center portion 27a of optical window 27, which center portion is along optical axis 24.

The length of optical fiber 38 is chosen to provide equal optical path lengths for the reference beam 17 and the object beam 18 between beam splitter 16 and window 27. It is also essential that both the reference and object light arrive at window 27 going in the same direction (in the illustrative embodiment along axis 24). Both light beams pass through iris 28 and are focused by lens 30 onto the screen of vidicon 33, the two beams being combined. The output of vidicon 33 is fed to an appropriate electronic processor 45 per techniques well known in the prior art as described, for example, in the aforementioned Pat. No. 4,018,531, and thence from the processor fed to video monitor 50 for display. In the testing of object 20, this object is vibrated by means of transducer 60 which is driven by oscillator 62 at a frequency of the order of 1 kHz to 200 kHz. This causes vibration of surface 20a, such that if there are any breaks or flaws in the structure, as might for example occur at a bond point when subjected to such vibratory stress, this will cause an irregular displacement at this point on the surface as compared with the remaining points on the surface. This will effect the object light beam so as to produce a corresponding irregularity in the interference pattern developed between the object and reference beam. This irregularity will be displayed on the video monitor, thereby indicating its presence to the inspector.

Referring now to FIG. 2, a mode stripper which may be employed in the preferred embodiment of the invention is illustrated. Optical fiber 38 is carried within aluminum tube 70, preferably at a position along the central axis thereof in a plastic body 73 which is cast around the optical fiber. Plastic body 73 must have a higher index of refraction than optical fiber 38 such that any optical modes developed in the cladding of the fiber will be refracted outwardly toward the inner wall of tubing 70 which has a black coating 70a thereon to absorb the light energy impinging thereon. Body 73 may be of a commercially available styrene plastic, the only essential requirement being that this plastic have a higher index of refraction than the optical fiber.

The top end portion 38a of the optical fiber is cast in an optical epoxy with the top end of tube 70 being covered by a glass window 75. The optical fiber 38 is covered with an inner cover 78 and an outer cover 79 throughout its entire length except for the upper end portions thereof cast within tubing 70 (as shown in FIG. 2). a holding diaphragm 80 may be used to retain the optical fiber in place within tubing 70 prior to casting of the plastic material.

While the invention has been described and illustrated in detail, it is to be clearly understood that this is intended by way of illustration and example only and is not to be taken by way of limitation, the spirit and scope of the invention being limited only by the terms of the following claims.

We claim:

1. In a speckle pattern interferometer for testing an object, including means for generating a coherent light beam, means for splitting said beam into reference and object beams, means for directing said object beam towards said object, means for cyclically displacing said object, said object beam being reflected from said object along a predetermined optical axis, means for recombining the object and reference beams, means for detecting the recombined object and reference beams, means for processing the combined beams, and means for displaying the combined beams, the improvement being means for channeling the reference beam from the beam splitting means to the recombining means along an optical path equal in length to that of said object beam between the beam splitting means and the recombining means comprising an optical fiber having one end thereof positioned to receive the reference beam from said beam splitting means, said fiber running to a point whereat the other end thereof is directly opposite said detecting means, said fiber directing the object beam towards said detecting means along said predetermined axis.

2. The interferometer of claim 1 and further including mode stripper means for "stripping" undesired modes of light from said fiber.

3. The interferometer of claim 2 wherein said mode stripper means comprises an opaque hollow member having light absorbent inner walls and an optically refractive material contained within said hollow member having an index of refraction greater than that of the optical fiber, said one end of said optical fiber being surrounded by said optically refractive material such that the light modes in the cladding of said fiber are refracted towards the inner walls of said hollow member.

4. The interferometer of claim 3 wherein said hollow member is tubular and has black inner walls, said refractive material comprising a plastic cast in said tubular member, the fiber being set in the plastic.

5. The interferometer of claim 3 and further including an optical window in which the other end of said optical fiber is fixedly mounted.

* * * * *